United States Patent
Salvador

(10) Patent No.: US 9,378,729 B1
(45) Date of Patent: Jun. 28, 2016

(54) MAXIMUM LIKELIHOOD CHANNEL NORMALIZATION

(71) Applicant: Amazon Technologies, Inc., Reno, NV (US)

(72) Inventor: Stan Weidner Salvador, Tega Cay, SC (US)

(73) Assignee: Amazon Technologies, Inc., Seattle, WA (US)

( * ) Notice: Subject to any disclaimer, the term of this patent is extended or adjusted under 35 U.S.C. 154(b) by 266 days.

(21) Appl. No.: 13/797,662

(22) Filed: Mar. 12, 2013

(51) Int. Cl.
| | |
|---|---|
| *G10L 15/04* | (2013.01) |
| *G10L 15/02* | (2006.01) |
| *G10L 15/20* | (2006.01) |
| *G10L 15/14* | (2006.01) |
| *G10L 15/08* | (2006.01) |

(52) U.S. Cl.
CPC ............... *G10L 15/02* (2013.01); *G10L 15/14* (2013.01); *G10L 15/20* (2013.01); *G10L 15/08* (2013.01); *G10L 15/142* (2013.01)

(58) Field of Classification Search
CPC ... G10L 15/06; G10L 15/063; G10L 15/0631; G10L 15/0635; G10L 15/0636; G10L 15/0638; G10L 15/08; G10L 15/14; G10L 15/142; G10L 15/144; G10L 15/146; G10L 15/148; G10L 15/20; G10L 17/16

See application file for complete search history.

(56) References Cited

U.S. PATENT DOCUMENTS

| | | | | |
|---|---|---|---|---|
| 6,421,641 | B1* | 7/2002 | Huang et al. | 704/250 |
| 8,078,462 | B2* | 12/2011 | Shinohara | G10L 15/065 |
| | | | | 704/228 |
| 2003/0130844 | A1* | 7/2003 | Chaudhari et al. | 704/240 |
| 2004/0015352 | A1* | 1/2004 | Ramakrishnan et al. | 704/240 |
| 2004/0230424 | A1* | 11/2004 | Gunawardana | 704/219 |
| 2005/0027523 | A1* | 2/2005 | Tarlton et al. | 704/234 |
| 2006/0195317 | A1* | 8/2006 | Graciarena et al. | 704/233 |
| 2011/0015925 | A1* | 1/2011 | Xu et al. | 704/233 |
| 2011/0208521 | A1* | 8/2011 | McClain | 704/233 |
| 2013/0054234 | A1* | 2/2013 | Kim et al. | 704/226 |
| 2013/0185070 | A1* | 7/2013 | Huo | G10L 15/063 |
| | | | | 704/243 |

* cited by examiner

*Primary Examiner* — Richard Zhu
(74) *Attorney, Agent, or Firm* — Knobbe, Martens, Olson & Bear, LLP

(57) ABSTRACT

Features are disclosed for applying maximum likelihood methods to channel normalization in automatic speech recognition ("ASR"). Feature vectors computed from an audio input of a user utterance can be compared to a Gaussian mixture model. The Gaussian that corresponds to each feature vector can be determined, and statistics (e.g., constrained maximum likelihood linear regression statistics) can then be accumulated for each feature vector. Using these statistics, or some subset thereof, offsets and/or a diagonal transform matrix can be computed for each feature vector. The offsets and/or diagonal transform matrix can be applied to the corresponding feature vector to generate a feature vector normalized based on maximum likelihood methods. The ASR process can then proceed using the transformed feature vectors.

30 Claims, 5 Drawing Sheets

_US 9,378,729 B1_

MAXIMUM LIKELIHOOD CHANNEL NORMALIZATION

BACKGROUND

Computing devices can be used to process a user's spoken commands, requests, and other utterances into written transcriptions. In a common application, a user can speak into a microphone of a computing device, and an automated speech recognition module executing on the computing device can process the audio input and determine what the user said. Additional modules executing on the computing device can process the transcription of the utterance to determine what the user meant and/or perform some action based on the utterance.

Automated speech recognition systems typically include an acoustic model and a language model. The acoustic model is used to generate hypotheses regarding which subword units (e.g., phonemes) correspond to an utterance based on the acoustic features of the utterance. The language model is used to determine which of the hypotheses generated using the acoustic model is the most likely transcription of the utterance based on lexical features of the language in which the utterance is spoken. The acoustic model and language model are typically configured using training data, including transcriptions known to be correct.

In some automated speech recognition systems, audio input of an utterance is separated into time slices, referred to as frames (e.g., a frame=10 milliseconds of the utterance). Each of the frames is processed using statistical methods such that the frames more closely correspond to portions of the acoustic model. This process may be referred to as normalization. In many cases, after a preliminary transcript is generated, a second speech recognition pass is performed using other statistical methods selected to maximize the likelihood of an accurate transcription. This process may be referred to as speaker adaptation.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
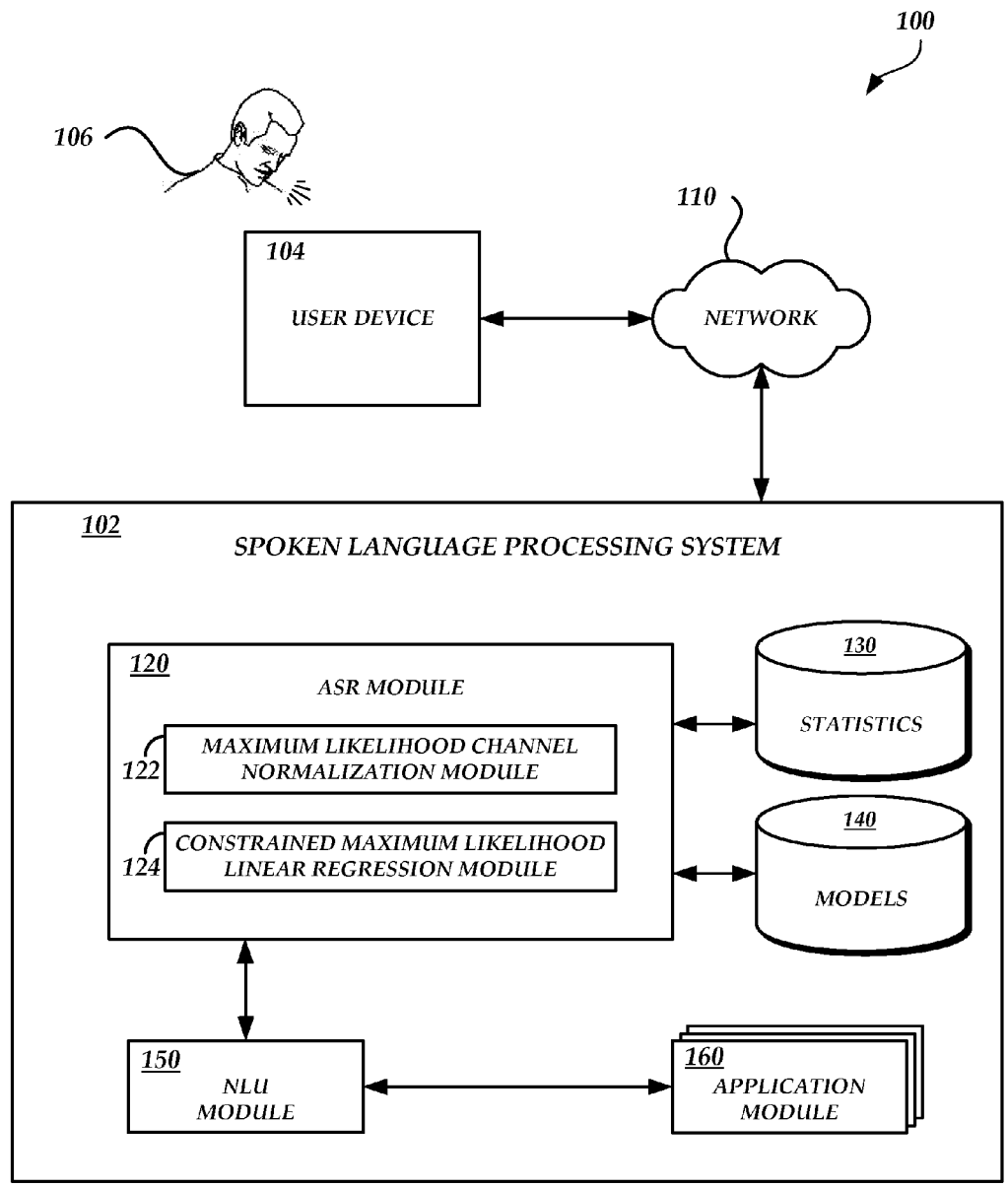
FIG. 1 is a block diagram of an illustrative network computing environment including a user device and a spoken language processing system in communication via a network.

Automatic speech recognition ("ASR") systems may use a number of different techniques to process a user utterance and generate one or more transcriptions of the utterance. Some ASR systems employ two processing passes. For example, a first processing pass can be performed using, at least in part, channel normalization (also known as cepstral mean and variance normalization) to generate a transcription of the utterance. Channel normalization typically involves calculation of offsets and/or scaling factors from the input data, and application of those factors to the input data to normalize or otherwise adjust the mean and/or variance of the input data or portions thereof. These offsets and scaling factors are based on averages and other statistical analyses of the input data and are intended to update the input data to have a zero mean and a unit variance (e.g., a standard deviation of 1); they are not necessarily intended to maximize any particular criteria related to speech recognition processing. A transcription can be generated from the offset and/or scaled input data. A second processing pass can be performed using the generated transcription and constrained maximum likelihood linear regression ("cMLLR") to generate a more accurate transcription. cMLLR can generate more accurate results than channel normalization because cMLLR aims to maximize the likelihood of a match or correspondence between input data and the acoustic model against which the input data is processed. However, cMLLR generally requires a preliminary transcript with which to align the input data. In addition, computation of the full covariance transform matrices used in cMLLR requires a large amount of data or substantial processing time and other resources when compared to channel normalization. Such time and resource requirements make it difficult to use cMLLR for channel normalization.

Aspects of this disclosure relate to the application of maximum likelihood methods to channel normalization. The offset and/or scaling factors that are applied to the feature vectors for individual frames of input data can be calculated using maximum likelihood methods rather than calculated as the mean or unit variance scaling factor, as is typically used in channel normalization. By basing the offsets and/or scaling factors on maximum likelihood methods, the feature vectors of the input data can be transformed so as to maximize speech recognition criteria, as opposed to being transformed so as to have a zero mean and a unit variance.

For example, input data may be processed to obtain feature vectors (sets of parameters describing the input data) for individual frames. Channel normalization may be applied to the feature vectors before proceeding with the rest of the ASR process. Rather than arbitrarily updating the feature vectors to have a zero mean and a unit variance, as is commonly done in channel normalization, cMLLR transform matrices may be computed and applied to each frame based on statistics that were updated after processing each of any number of previously processed frames. Conventionally, the statistics that are used to compute cMLLR transform matrices are based on an alignment of the frames with a preliminary transcript. In some embodiments of maximum likelihood channel normalization, feature vectors may be compared to a model (e.g., a Gaussian mixture model ("GMM")), rather than a transcript, to determine the word, phoneme, or other speech unit to which the feature vector likely corresponds. The step of generating a preliminary transcript, which can require a partial or full ASR pass prior to using cMLLR, may therefore be skipped. The relevant statistics may be updated and a transform computed for each frame of the input data separately based on which Gaussian of the GMM most closely corresponds to the feature vector.

In some embodiments, a GMM that models both speech and non-speech data may be used to update the statistics from which the transforms are computed. In some embodiments, separate speech and non-speech GMMs may be used. In additional embodiments, a GMM for non-speech and a GMM for each phoneme or other speech unit (e.g., triphone) may be used.

Additional aspects of the present disclosure relate to correcting statistics that are accumulated or updated during speech processing for use in a second speech processing pass or during processing of subsequent utterances. The operation and output of some ASR processes can be improved by accumulating statistics separately for speech frames and non-speech frames (e.g., silence). During streaming (e.g., real-time) recognition, accumulation of such statistics into the proper statistical bucket is typically based on speech/non-speech models which may be only moderately accurate. However, the transcript that is generated can indicate speech and non-speech with a higher degree of accuracy. By aligning the generated transcript to the input data and identifying those frames which have been accumulated or updated incorrectly (e.g., statistics for non-speech frames that were accumulated with the speech frame statistics), the statistics may be repaired for use in a subsequent speech processing pass or for use in processing subsequent utterances.

Aspects of the embodiments described in the disclosure will focus, for the purpose of illustration, on a user device that transmits data to a networked spoken language processing system for processing. However, the systems and techniques described herein may be implemented on a single device, such as a user device that both receives spoken input and processes the input to determine the content of the user's utterance. Various aspects of the disclosure will now be described with regard to certain examples and embodiments, which are intended to illustrate but not limit the disclosure.

With reference to an illustrative embodiment, FIG. 1 shows a speech processing environment 100 that includes a spoken language processing system 102 and a user device 104 in communication via a communication network 110. A user 106 may issue spoken commands, requests, and other utterances to the user device 104. The user device 104 can transmit audio of the utterance, or data regarding the utterance, to the spoken language processing system 102 via the communication network 110. The spoken language processing system 102 can process the utterance to determine what the user 106 said and, optionally, to perform or initiate some action based on what the user 106 said. In some embodiments, the user device 104 or the user 106 may be associated with a particular spoken language processing system 102, or the user device 104 may be configured to transmit utterance data to any number of different spoken language processing systems 102. In some embodiments, the features described herein as being provided by the spoken language processing system 102 may be wholly or partially provided by the user device 104 or some other system or component.

The user device 104 can correspond to a wide variety of electronic devices. In some embodiments, the user device 104 may be a mobile device that includes one or more processors and a memory which may contain software applications executed by the processors. The user device 104 may include a microphone or other audio input component for accepting speech input on which to perform speech recognition. Illustratively, the user device 104 may be a mobile phone, personal digital assistant ("PDA"), mobile gaming device, media player, electronic book reader, tablet computer, laptop computer, or the like. The software of the user device 104 may include components for establishing communications over wireless communication networks or directly with other computing devices.

The communication network 110 may be any wired network, wireless network, or combination thereof. In addition, the network 110 may be a personal area network, local area network, wide area network, cable network, satellite network, cellular telephone network, or combination thereof. For example, the communication network 110 may be a publicly accessible network of linked networks, possibly operated by various distinct parties, such as the Internet. In some embodiments, the communication network 110 may be a private or semi private network, such as a corporate or university intranet. The communication network 110 may include one or more wireless networks, such as a Global System for Mobile Communications ("GSM") network, a Code Division Multiple Access ("CDMA") network, a Long Term Evolution ("LTE") network, or some other type of wireless network. Protocols and components for communicating via the Internet or any of the other aforementioned types of communication networks are well known to those skilled in the art of computer communications and thus need not be described in more detail herein.

The spoken language processing system 102 illustrated in FIG. 1 may correspond to a logical association of one or more computing devices configured to provide automatic speech recognition and other computing services to user devices 104 and other entities. The spoken language processing system 102 can include an ASR module 120, a natural language understanding ("NLU") module 150, any number of application modules 160, and various data stores 130, 140. In some embodiments, the spoken language processing system 102 may include additional or fewer modules or components than illustrated in FIG. 1. For example, a spoken language processing system 102 may not include an NLU module 150 or application modules 160. As another example, a spoken language processing system 102 may include addition data stores, such as data stores used by the NLU module 150, application modules 160, or additional data stores used by the ASR module 120.

The ASR module 120 can receive and process audio input in a maximum likelihood channel normalization module 122, a cMLLR module 124, and/or other modules or components used to perform automatic speech recognition. Illustratively, the maximum likelihood channel normalization module 122 may communicate with a statistics data store 130 and a models data store 140 to process audio input using maximum likelihood channel normalization, as described in detail below. In some embodiments, the output of the maximum likelihood channel normalization module 122 (or some other module that performs subsequent ASR processing) may be provided to the cMLLR module 124 for performance of a 2nd speech processing pass.

The output of the ASR module 120 may be provided to an NLU module 150 to interpret the output and/or determine the user's intent. Various applications 160 can use the output of the NLU module 150 to respond to user utterances or take actions in response to user utterances. Separate applications 160 may be implemented within the spoken language processing system 102 to perform different tasks. For example, the spoken language processing system 102 may include separate applications 160 for playing music, providing directions, performing searches, purchasing products, providing personal information management (e.g., calendars or contacts) and the like.

In some embodiments, the features and services provided by the spoken language processing system 102 may be implemented as web services consumable via a communication network 110. In further embodiments, the spoken language processing system 102 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

Process for Performing ASR with Maximum Likelihood Channel Normalization

Figure 2:
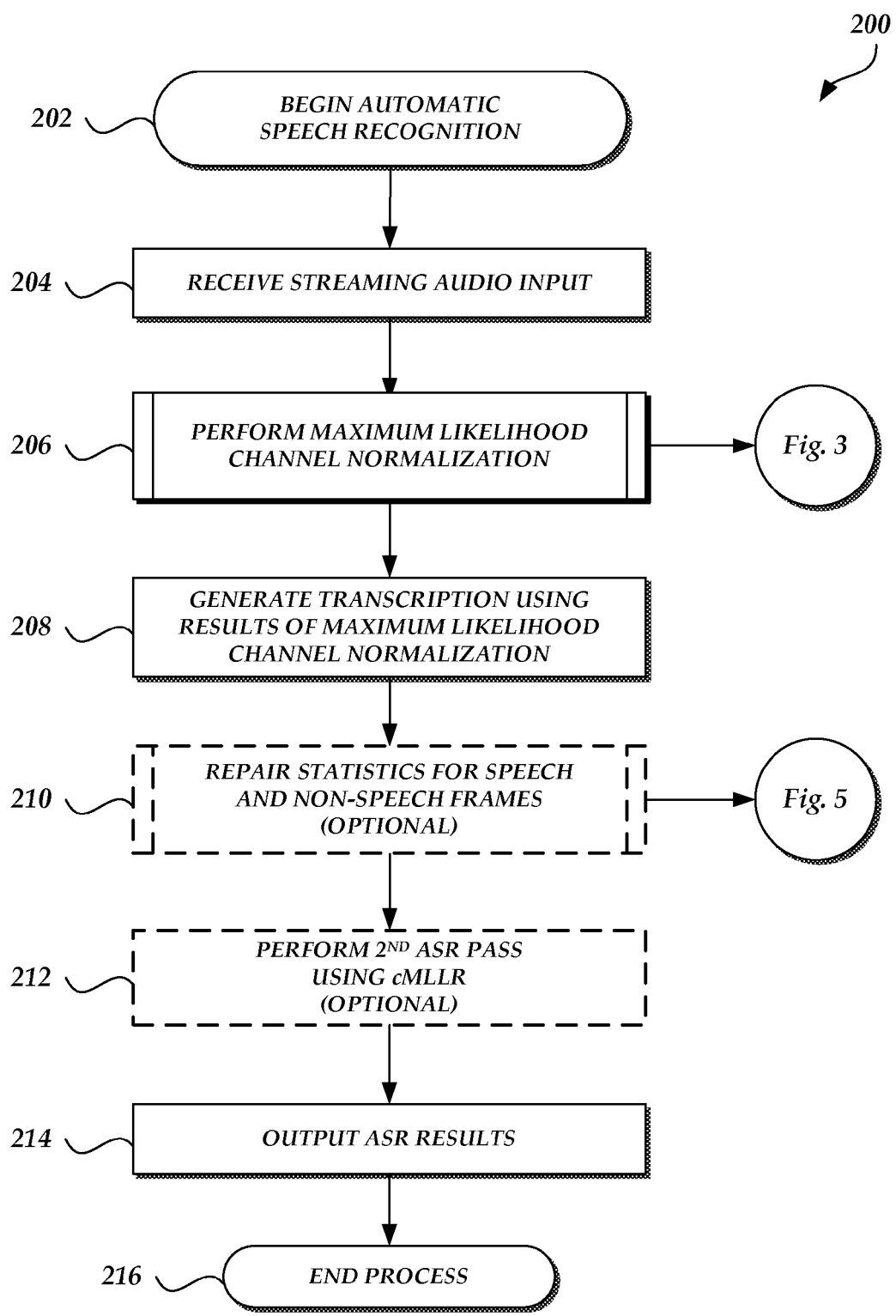
FIG. 2 is a flow diagram of an illustrative process for performing automatic speech recognition, including the use of maximum likelihood methods to perform channel normalization.

With reference now to FIG. 2, a sample process 200 for processing a user utterance to determine what a user said will be described. Advantageously, channel normalization of the input data may be performed using cMLLR offsets and/or a cMLLR matrix (e.g., a diagonal matrix or a full covariance matrix), rather than normalizing the input data based on the mean and/or desired variance of the input only. As a result, the transformations applied to the input data during channel normalization can be computed to maximize the likelihood of correspondence to the model against which the input data will be processed.

The process 200 begins at block 202. The process 200 may begin automatically upon initiation of a speech recognition session. For example, the process 200 may begin upon when a user device 104 establishes a speech recognition session with a spoken language processing system 102, upon receipt of an utterance by a spoken language processing system 102, etc. The process 200 may be embodied in a set of executable program instructions stored on a computer-readable medium, such as one or more disk drives, of a computing device of the spoken language processing system 102. When the process 200 is initiated, the executable program instructions can be loaded into memory of a computing device and executed by one or more processors in communication therewith.

At block 204, the ASR module 120 or some other module or component of the spoken language processing system 102 can receive audio input. The audio input may be a real-time audio stream of a user utterance. For example, a stream of audio may be received, via a communication network 110, from a user device 104. The user 106 may begin speaking into a microphone or other audio input of the user device 104, and audio of the utterance may be transmitted to the spoken language processing system 102 in substantially real time. In some embodiments, the audio may not be a real-time stream of audio, but rather may be a stream of previously recorded audio. In some embodiments, the audio input may be a file of previously recorded or obtained audio data.

At block 206, the maximum likelihood channel normalization module 122 or some other module or component can perform channel normalization on the audio input, as described in detail below with respect to FIG. 3. Maximum likelihood channel normalization may be performed instead of, or in addition, traditional channel normalization (e.g., cepstral mean and variance normalization). For example, a diagonal covariance cMLLR transform matrix may be used instead of arbitrarily adjusting features to zero mean and unit variance based on some prior sample of the feature vectors.

At block 208, the transformed feature vectors generated by the maximum likelihood channel normalization module 122 can be used to generate a transcription of the user utterance. Generally described, an acoustic model may be used to generate hypotheses regarding which subword units (e.g., phonemes) correspond to the transformed feature vectors or groups thereof. The specific transformations applied to the feature vectors have been computed such that the transformed feature vectors better correspond to the acoustic model. A language model may be used to determine which of the hypotheses generated using the acoustic model is the most likely transcription of the utterance based on lexical features of the language in which the utterance is spoken.

At block 210, the ASR module 120 may optionally repair statistics for speech and non-speech frames based on the transcription(s) produced in block 208. As described in detail in FIG. 5, the frames can be aligned with the transcription, and particular speech and non-speech frames can be identified. If statistics from a frame have been accumulated incorrectly (e.g., statistics regarding a speech frame have been accumulated in a non-speech frame bucket), the statistics corresponding to the frame can be removed from the wrong bucket and accumulated into the correct bucket. Such statistics may then be used in subsequent speech processing passes or to processes subsequent utterances.

At block 212, the cMLLR module 124 or some other module of the ASR module 120 may perform a second speech processing pass on the input data. In some cases, the cMLLR module 124 can utilize the initial transcript generated in block 208 to perform cMLLR. The transcript can be aligned with the audio input such that each frame of the audio input can be compared to acoustic model data corresponding to the transcript text for the frame. For example, frame x may correspond to a particular phoneme or triphone y of the generated transcript, and the original feature vector (e.g., the untransformed feature vector) for frame x can be compared to phoneme or triphone model y. Any mismatch between the feature vector for frame x and model y can be observed. A cMLLR transform can be computed that nudges the feature vector for frame x closer to model y, and statistics can be updated for use in computing subsequent transforms. The transformed feature vectors can then be processed to determine a new transcript in a manner similar to that described above with respect to block 208.

At block 214, the ASR module 120 may generate an output for use by an NLU module 150, application 160, or some other module, component, or system. The ASR results may be generated in the form of an N-best list or a lattice of transcriptions. A lattice may be a directed acyclic graph where the segments (or arcs) are associated with recognized words (or subword units) in the hypotheses and the words are joined at nodes. Each segment may be associated with a probability that the word associated with the segment is a correct word. Each path through the lattice may correspond to a recognition hypothesis.

Maximum Likelihood Channel Normalization Process

Figure 3:
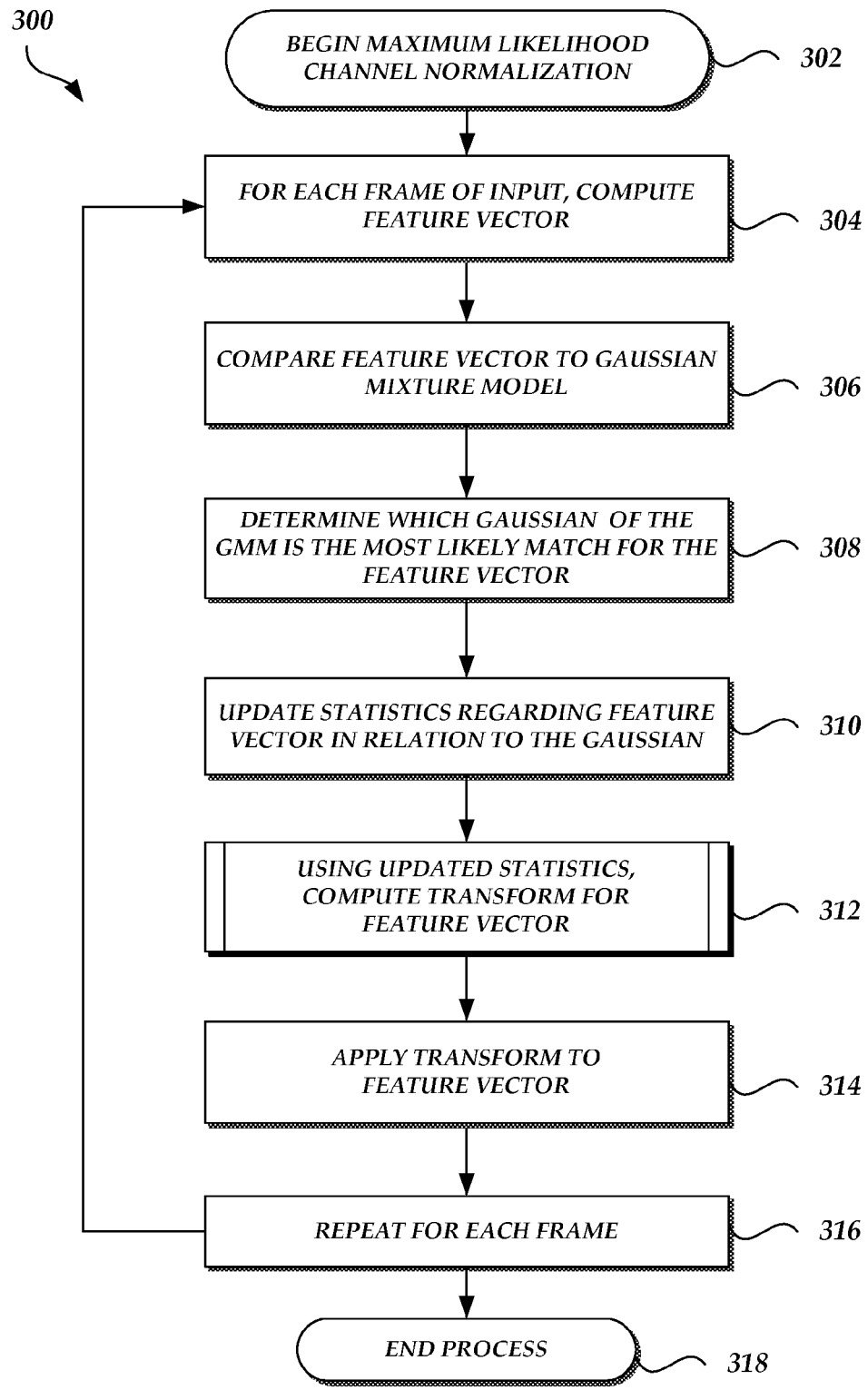
FIG. 3 is a flow diagram of an illustrative process for implementing maximum likelihood speech processing techniques while performing channel normalization.

With reference now to FIG. 3, a sample process 300 for applying maximum likelihood methods to channel normalization will be described. Advantageously, by using maximum likelihood methods rather than arbitrarily chosen zero-mean and unit-variance transformations, the feature vectors of the input data can be transformed to maximize or optimize particular speech recognition criteria. In addition, the transforms that are computed and applied in the process 300 can provide speaker or environmental adaptation.

The process 300 begins at block 302. The process 300 may begin automatically upon receipt of audio input by a spoken language processing system 102. The process 300 may be embodied in a set of executable program instructions stored on a computer-readable medium, such as one or more disk drives, of a computing device of the spoken language processing system 102. When the process 300 is initiated, the executable program instructions can be loaded into memory of a computing device and executed by one or more processors in communication therewith.

Figure 4:
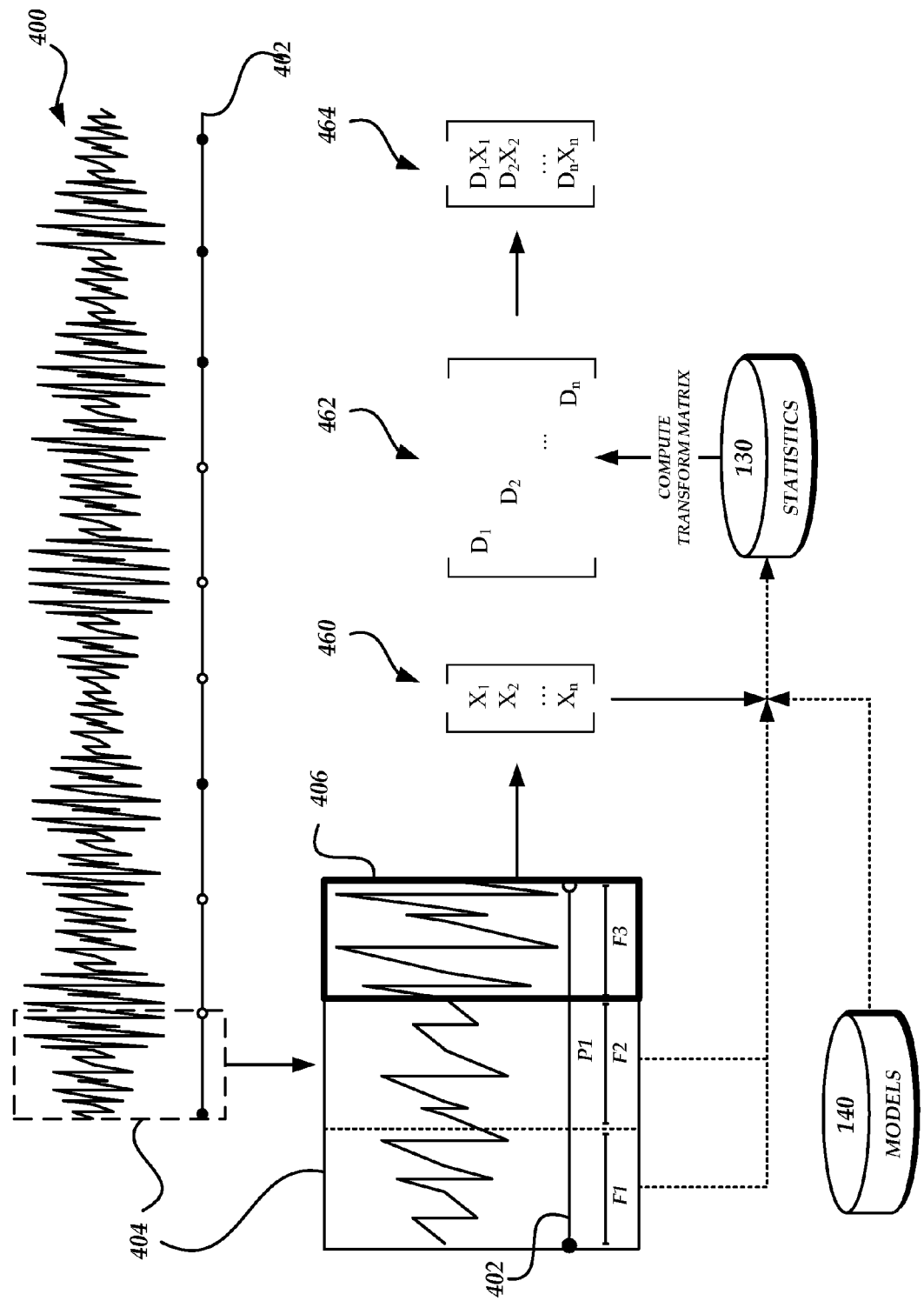
FIG. 4 is a sound diagram of an illustrative user utterance separated into frames for automatic speech recognition processing.

At block 304, the maximum likelihood channel normalization module 122 or some other module or component can extract features for a frame of input data and compute a feature vector. A frame of input data may be a predetermined or dynamically determined time slice of the input data (e.g., 10 milliseconds). FIG. 4 shows an illustrative waveform 400 of audio input. A section 404 of the waveform 400 is enlarged to show three frames F1, F2 and F3. If the current frame that is being processed is frame F3 (also labeled as frame 406 in FIG. 4), then feature vector 460 can be computed based on the features of frame 406.

At block 306, the maximum likelihood channel normalization module 122 or some other module or component can compare the feature vector 460 for the current frame (e.g., in this case, frame 406 of FIG. 4) to a speech recognition model or some portion thereof (e.g., a Gaussian mixture model). The Gaussian mixture model used in block 306 may be a full acoustic model. In some embodiments, the Gaussian mixture model used in block 306 may be a lightweight model with a subset of the full acoustic model data.

At block 308, the maximum likelihood channel normalization module 122 or some other module or component can determine which element of the speech recognition model (e.g., which Gaussian of the Gaussian mixture model) is closest to the feature vector 460 for the current frame 406. The identified Gaussian or other element can be used to determine the phoneme, triphone, or other subword unit to which the frame corresponds. In some embodiments, multiple Gaussians may be identified (e.g., the n-best matching Gaussians). The purpose of identifying one or more Gaussians is to update statistics, at block 310, regarding the feature vector 460 and its correspondence to the model for the phoneme, triphone, or other subword unit that the frame represents. However, rather than obtaining a complete transcription of the utterance, as would be done via a first speech recognition pass performed prior to a second cMLLR-based speech recognition pass (e.g., using hidden Markov models ("HMMs")), the maximum likelihood channel normalization module 122 can quickly determine the best fitting or matching subword unit for one frame at a time in order to accumulate or update statistics. As a result, this technique can be used in a real-time or streaming recognizer that processes an utterance frame-by-frame. Traditional two-pass cMLLR-based speech recognition cannot easily be used in such streaming recognizers due to the need for a preliminary transcript. As seen in FIG. 4, the frames of the enlarged portion 404, including frame 406, correspond to the Gaussian(s) for phoneme P1.

At block 310, the maximum likelihood channel normalization module 122 or some other module or component can update the statistics that will be used to compute the transform for the feature vector 460. For example, statistics regarding the feature vector 460 for the current frame 406 in relation to the closest Gaussian may be added to the statistics that have already been computed for previously processed frames. As described above, the Gaussian that is the best fit for the current frame indicates the phoneme, triphone, etc. to which the frame corresponds. Because the maximum likelihood channel normalization module 122 has access to this "transcript" for the current frame (e.g., that frame 406 corresponds to phoneme P1), cMLLR-based statistics can be updated (e.g., in the statistics data store 130). Such statistics can be used in subsequent blocks to generate offset and/or transform matrices.

At block 312, the maximum likelihood channel normalization module 122 or some other module or component can compute a transform for the feature vector 460 of the current frame 406 based on the statistics 130. In some embodiments, only the statistics 130 associated with frames within a predetermined or dynamically determined period of time are used in computing the transform (e.g., only frames within in a trailing window of time). For example, only the statistics associated with frames of the previous 10 seconds, 5 seconds, or 3 seconds of input audio may be used. In some embodiments, the statistics associated with previous frames are decayed in the accumulation such that the statistics associated with all prior frames (or some subset thereof) are used in computing the transformation, with more recent statistics being given a higher weight or comprising a larger portion of the statistics used. In some embodiments, the trailing window may include frames from prior utterances, such that the statistics 130 used to compute a transform for the current feature vector 460 may include statistics from prior utterances.

As shown in FIG. 4, a diagonal cMLLR transform matrix 462 may be computed or updated based on the statistics 130 to alter the feature vector 430 such that the feature vector 430 better fits the acoustic model against which the audio input is being decoded. In some embodiments, offsets can be computed instead of, or in addition to, a diagonal cMLLR transform matrix 462. In some embodiments, a full covariance cMLLR transform matrix may be computed or updated.

At block 314 the maximum likelihood channel normalization module 122 or some other module or component can apply the transform computed in block 312 to the feature vector 460 for the current frame 406. For example, if a diagonal transform matrix 462 is computed in block 312, the feature vector 460 may be multiplied by the diagonal transform matrix 462 to generate a transformed feature vector 464, as shown in FIG. 4. If offsets are determined in block 312, those offsets may be applied to the feature vector 460 instead of or in addition to application of a diagonal transform matrix 462.

At block 316, the process 300 can return to block 304 for each remaining frame in the input data. Statistics can continue to be updated or accumulated as described in block 310. If there are no remaining frames in the input data to process, the process 300 may proceed to bock 318 where maximum likelihood channel normalization ends. Subsequently, the transformed feature vectors can be used to generate ASR results, and an optional second speech recognition processing pass may be performed, as described above with respect to FIG. 2.

Process for Repairing Statistics

Figure 5:
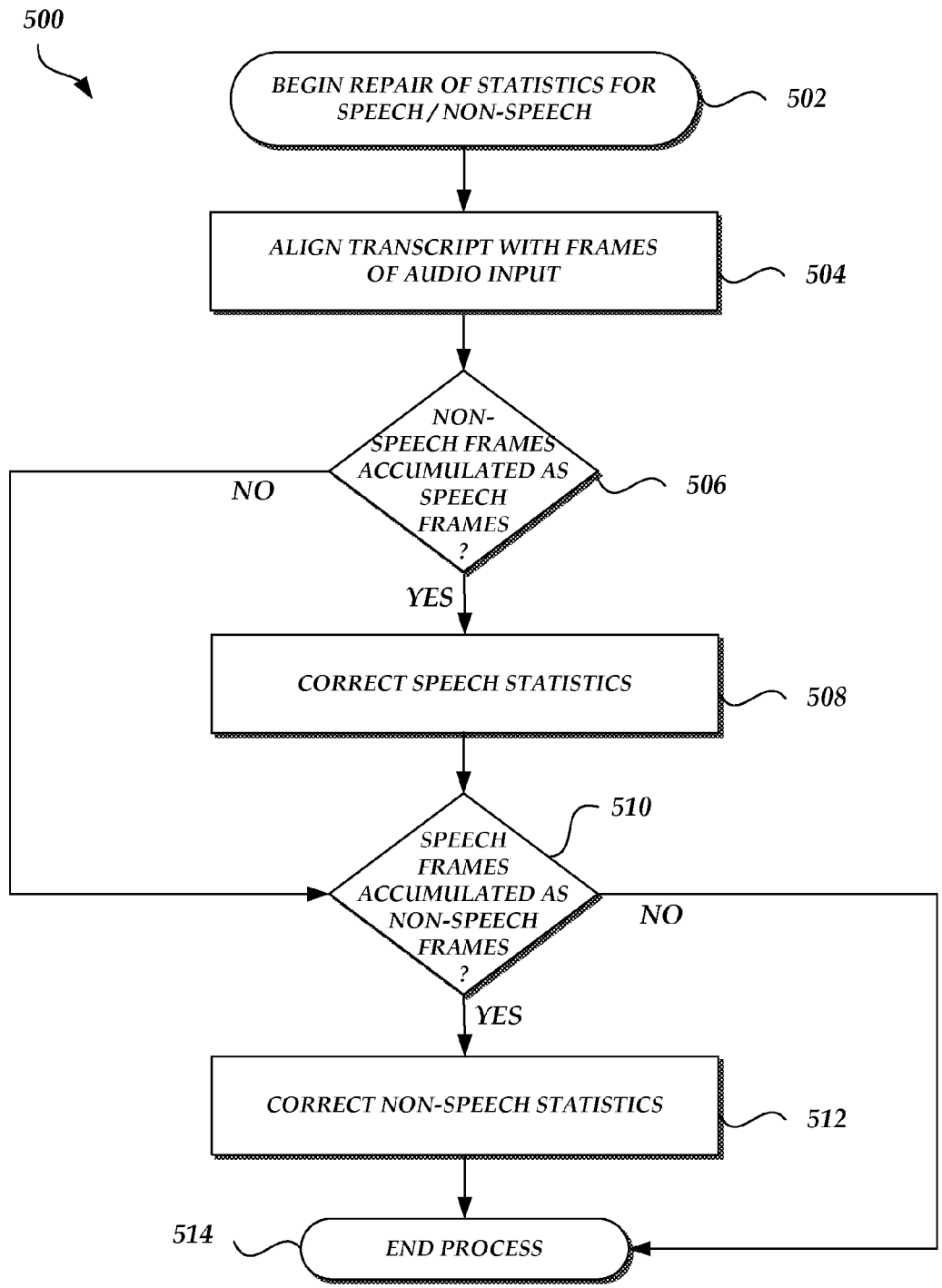
FIG. 5 is a flow diagram of an illustrative process for correcting previously updated or accumulated statistics based on a likelihood that certain frames represent speech or non-speech.

With reference now to FIG. 5, a sample process 500 for repairing statistics updated or accumulated for speech and non-speech frames will be described. In some ASR systems, a cMLLR transform may be computed based on statistics regarding speech frames (e.g., statistics for non-speech frames may be excluded so that they do not affect the recognition of speech frames). Advantageously, the transcript generated by a first, final, or sole speech processing pass may aligned to input data to determine with a high degree of confidence which frames correspond to speech and which correspond to non-speech. Statistical accumulations can then be corrected so that subsequent speech processing will be based on more accurate statistical accumulations and therefore produce more accurate results.

The process 500 begins at block 502. The process 500 may begin automatically upon completion of speech recognition processing, or of one speech processing pass. For example, the process 500 may begin when a transcript is generated after using constrained maximum likelihood channel normalization, as described in detail above. The process 500 may be embodied in a set of executable program instructions stored on a computer-readable medium, such as one or more disk drives, of a computing device of the spoken language processing system 102. When the process 500 is initiated, the executable program instructions can be loaded into memory of a computing device and executed by one or more processors in communication therewith.

At block 504, the ASR module 120 or some other module or component can align a generated transcript of an utterance with audio input of the utterance. The alignment allows the ASR module 120 to determine which portions of the audio input (e.g., which individual frames) corresponds to which words or subword units (e.g., phonemes, triphones, etc.) of the transcript. As described above, the transcript that is used may be a transcript generated during a single-pass speech recognition process, or a transcript generated after the second pass of a multi-pass speech recognition process.

At decision block 506, the ASR module 120 or some other module or component can determine whether any non-speech frames have had statistics accumulated with those of speech frames. For example, the ASR module 120 may maintain a record (e.g., within the statistics data store 130) indicating the bucket into which the statistics associated with each frame have been initially accumulated. The ASR module 120 can identify particular frames that are aligned with non-speech portions of the transcript. If the statistics associated with those frames have been incorrectly accumulated in the speech frame bucket instead of the non-speech bucket, then the speech frame bucket can be corrected or repaired at block 508 by removing (e.g., subtracting out) the previously accumulated statistics associated with non-speech frames. The statistics can then be added into the non-speech statistics bucket. If no non-speech frames have had statistics accumulated with those of speech frames, the process 500 can proceed to decision block 510.

At decision block 510, the ASR module 120 or some other module or component can determine whether any speech frames have had statistics accumulated with those of non-speech frames. The ASR module 120 can identify particular frames that are aligned with speech portions of the transcript. If the statistics associated with those frames have been incorrectly accumulated in the non-speech frame bucket, then the non-speech frame bucket can be corrected or repaired at block 512 by removing (e.g., subtracting out) the previously accumulated statistics associated with speech frames. The statistics can then be added into the speech statistics bucket. If no speech frames have had statistics accumulated with those of non-speech frames, the process 500 can proceed to block 514, wherein the process 500 terminates.

The corrected statistics can be used during a second speech recognition pass, such as a cMLLR-based speech recognition pass, as described above with respect to FIG. 2. In some embodiments, the corrected statistics can be saved for use in processing future utterances. For example, if the same user device 104 or user 106 subsequently submits an utterance for processing, the corrected statistics may be used in computing feature vector transforms, thereby providing better accuracy beginning with the first frame of the subsequent utterance, particularly if the subsequent utterance was made by the same user under the same environmental conditions.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines and algorithm steps described in connection with the embodiments disclosed herein can be implemented as electronic hardware, computer software, or combinations of both. To clearly illustrate this interchangeability of hardware and software, various illustrative components, blocks, modules and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y or Z, or a combination thereof. Thus, such conjunctive language is not generally intended to imply that certain embodiments require at least one of X, at least one of Y and at least one of Z to each be present.

While the above detailed description has shown, described and pointed out novel features as applied to various embodiments, it can be understood that various omissions, substitutions and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
   a computer-readable memory storing executable instructions; and
   one or more processors in communication with the computer-readable memory, wherein the one or more processors are programmed by the executable instructions to at least:
      receive a stream of audio data regarding an utterance of a user;
      calculate a first feature vector based at least partly on a first frame of the audio data;
      perform a comparison of a Gaussian mixture model to the first feature vector;
      identify a first Gaussian of the Gaussian mixture model based at least partly on the comparison of the Gaussian mixture model to the first feature vector;
      compute a first likelihood based at least partly on the first feature vector and the first Gaussian;
      generate first updated speech recognition statistics based at least partly on speech recognition statistics and the first likelihood computed based at least partly on the first feature vector and the first Gaussian;
      generate a first updated feature-vector transform based at least partly on a feature-vector transform and the first updated speech recognition statistics;
      generate a first normalized feature vector based on the first updated feature-vector transform and the first feature vector;
      calculate a second feature vector based at least partly on a second frame of the audio data;
      perform a comparison of the Gaussian mixture model to the second feature vector;
      identify a second Gaussian of the Gaussian mixture model based at partly on the comparison of the Gaussian mixture model to the second feature vector;
      compute a second likelihood based at least partly on the second feature vector and the second Gaussian; and
      generate second updated speech recognition statistics based on the first updated speech recognition statistics and the second likelihood computed based at least partly on the second feature vector and the second Gaussian;
      subsequent to generating the first normalized feature-vector:
         generate a second updated feature-vector transform based on the first updated feature-vector transform, a time associated with the first frame, and the second updated speech recognition statistics; and
         generate a second normalized feature vector based on the second updated feature-vector transform and the second feature vector.

2. The system of claim 1, wherein the feature-vector transform comprises at least one of: an offset or a diagonal transform matrix.

3. The system of claim 1, wherein the speech recognition statistics comprise constrained maximum likelihood linear regression statistics.

4. The system of claim 1, wherein the one or more processors are further programmed to:
   generate first speech recognition results based at least partly on the first normalized feature vector and the second normalized feature vector; and
   generate, based at least partly on the first speech recognition results, second speech recognition results using constrained maximum likelihood linear regression.

5. The computer-implemented method comprising:
   calculating, by a spoken language processing system comprising one or more computing devices, a first feature vector based at least partly on a first frame of audio data regarding an utterance;
   calculating, by the spoken language processing system, a second feature vector based at least partly on a second frame of the audio data;
   performing a comparison of a speech recognition model with the first feature vector;
   generating first updated statistics based at least partly on statistics and the comparison of the speech recognition model with the first feature vector;
   generating a first updated transform based at least partly on a transform and the first updated statistics
   generating a first normalized feature vector based on the first updated transform and the first feature vector; and
   subsequent to generating the first normalized feature vector:
      performing a comparison of the speech recognition model with the second feature vector;
      generating second updated statistics based on the first updated statistics and the comparison of the speech recognition model with the second feature vector;
      generating a second updated transform based on the first updated transform, a time associated with the first frame, and the second updated statistics; and
      generating a second normalized feature vector based on the second updated transform and the second feature vector.

6. The computer-implemented method of claim 5, further comprising:
   determining whether the difference exceeds a threshold amount of time,
   wherein generating the second updated transform comprises one of:
      generating the second updated transform using the portion of the second updated statistics associated with the first frame in response to determining that the difference does not exceed the threshold amount of time; or
      generating the second updated transform without using the portion of the second updated statistics associated with the first frame in response to determining that the difference exceeds the threshold amount of time.

7. The computer-implemented method of claim 5, wherein the transform comprises one of: an offset or a diagonal transform matrix.

8. The computer-implemented method of claim 5, wherein the statistics comprise constrained maximum likelihood linear regression statistics.

9. The computer-implemented method of claim 5, further comprising:
   generating, based at least partly on the first normalized feature vector and the second normalized feature vector, first speech recognition results.

10. The computer-implemented method of claim 9, further comprising:
generating second speech recognition results based at least partly on the first speech recognition results.

11. The computer-implemented method of claim 9, further comprising:
updating the statistics separately for speech frames and non-speech frames; and
adjusting the second updated statistics based at least partly on the first speech recognition results, wherein adjusting the second undated statistics comprises at least one of:
removing statistics for a speech frame from statistics updated separately for non-speech frames, or
removing statistics for a non-speech frame from statistics updated separately for speech frames.

12. The computer-implemented method of claim 5, wherein the speech recognition model comprises a Gaussian mixture model.

13. The computer-implemented method of claim 5, wherein generating the second updated transform is based at least partly on a subset of the second updated statistics, the subset comprising statistics associated with frames of the audio data within a period of time of the second frame.

14. The computer-implemented method of claim 5, further comprising altering a weight associated with a portion of the second updated statistics based at least partly on a time associated with the portion.

15. The computer-implemented method of claim 5, further comprising determining a difference between the time associated with the first frame and a time associated with the second frame, wherein a portion of the second updated statistics is associated with the first frame.

16. The computer-implemented method of claim 15, further comprising:
determining whether the difference exceeds a threshold amount of time, wherein generating the second updated transform comprises one of:
generating the second updated transform using the portion of the second updated statistics associated with the first frame in response to determining that the difference does not exceed the threshold amount of time; or
generating the second updated transform without using the portion of the second updated statistics associated with the first frame in response to determining that the difference exceeds the threshold amount of time.

17. The computer-implemented method of claim 15, further comprising calculating a weight based on the difference,
wherein the weight corresponds to an extent to which the portion of the second updated statistics associated with the first frame is used in generating the second updated transform, and
wherein generating the second updated transform is further based on the weight.

18. The computer-implemented method of claim 15, wherein performing a comparison of a speech recognition model with the first feature vector comprises:
identifying an element within the speech recognition model that corresponds with the first feature vector, wherein the element is associated with a subword unit; and
determining a difference between the first feature vector and the element identified in the speech recognition model.

19. The computer-implemented method of claim 18, wherein:
the statistics represent a likelihood that the first feature vector corresponds to the subword unit associated with the element identified in the speech recognition model; and
generating the first updated statistics based at least partly on the statistics and the comparison of the speech recognition model with the first feature vector comprises adjusting the likelihood that the first feature vector corresponds to the subword unit based on the difference between the first feature vector and the element identified in the speech recognition model.

20. The computer-implemented method of claim 18, wherein:
the first updated transform is a diagonal transform matrix; and
generating the first normalized feature vector based on the first updated transform and the first feature vector comprises multiplying the first feature vector by the diagonal transform matrix.

21. One or more non-transitory computer readable media comprising executable code that, when executed, cause one or more computing devices to perform a process comprising:
calculating a first feature vector based at least partly on a first frame of audio data regarding an utterance;
calculating a second feature vector based at least partly on a second frame of the audio data;
performing a comparison of a speech recognition model with the first feature vector;
determining a first subword unit corresponding to the first feature vector based at least in part on the comparison of the speech recognition model with the first feature vector;
generating first updated statistics based at least partly on statistics, the first subword unit, and the first feature vector;
generating a first updated transform based at least partly on a transform and the first updated statistics;
generating a first normalized feature vector based on the first updated transform and the first feature vector; and
subsequent to generating the first normalized feature vector:
performing a comparison of the speech recognition model with the second feature vector;
determining a second subword unit corresponding to the second feature vector based at least in part on the comparison of the speech recognition model with the second feature vector;
generating second updated statistics based on the first updated statistics, the second subword unit, and the second feature vector;
generating a second updated transform based on the first updated transform, a time associated with the first frame, and the second updated statistics; and
generating a second normalized feature vector based on the second updated transform and the second feature vector.

22. The one or more non-transitory computer readable media of claim 21, wherein the audio data is received, by the one or more computing devices, in a substantially real-time stream.

23. The one or more non-transitory computer readable media of claim 21, wherein the transform comprises one of: an offset or a diagonal transform matrix.

24. The one or more non-transitory computer readable media of claim 21, wherein the statistics comprise constrained maximum likelihood linear regression statistics.

25. The one or more non-transitory computer readable media of claim 21, wherein the process further comprises:
   generating, based at least partly on the first normalized feature vector and the second normalized feature vector, first speech recognition results.

26. The one or more non-transitory computer readable media of claim 25, further comprising:
   generating second speech recognition results based at least partly on the first speech recognition results.

27. The one or more non-transitory computer readable media of claim 25, wherein the process further comprises:
   updating statistics separately for speech frames and non-speech frames; and
   adjusting the second updated statistics based at least partly on the first speech recognition results, wherein adjusting the second updated statistics comprises at least one of:
   removing statistics for a speech frame from statistics updated separately for non-speech frames, or
   removing statistics for a non-speech frame from statistics updated separately for speech frames.

28. The one or more non-transitory computer readable media of claim 25, wherein the speech recognition model comprises a Gaussian mixture model.

29. The one or more non-transitory computer readable media of claim 28, wherein the Gaussian mixture model comprises a subset of data from an acoustic model, and wherein generating the first speech processing results is based at least in part on the acoustic model.

30. The one or more non-transitory computer readable media of claim 28, wherein a comparison of a speech recognition model with the first feature vector comprises identifying a first Gaussian of the Gaussian mixture model based at least partly on a likelihood that the first feature vector corresponds to the Gaussian.

* * * * *